No. 727,764. PATENTED MAY 12, 1903.
E. B. ELLICOTT.
ELECTRICAL PROTECTIVE DEVICE.
APPLICATION FILED DEC. 17, 1901.
NO MODEL.
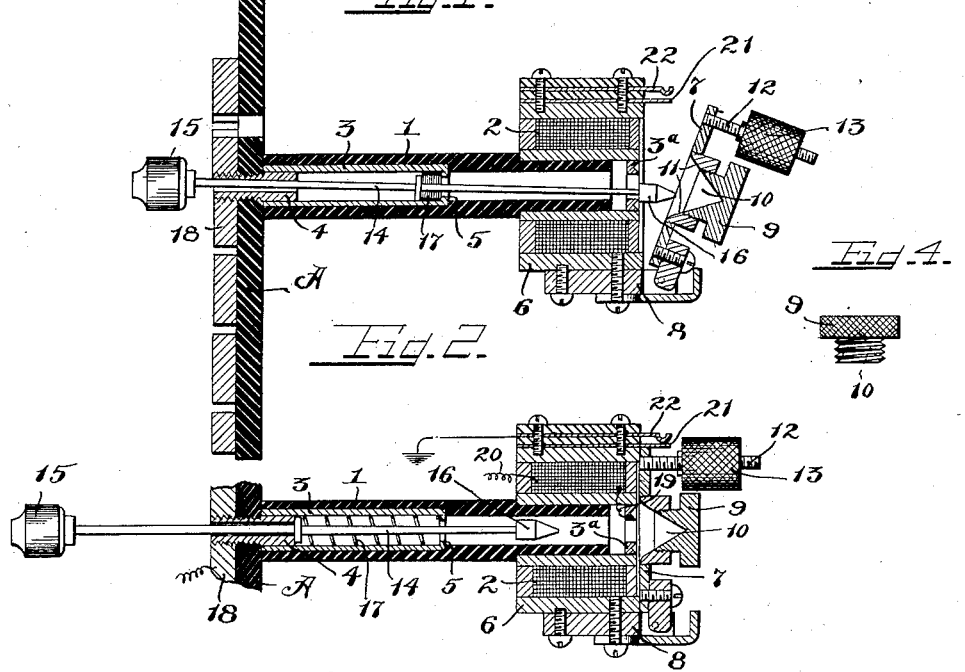
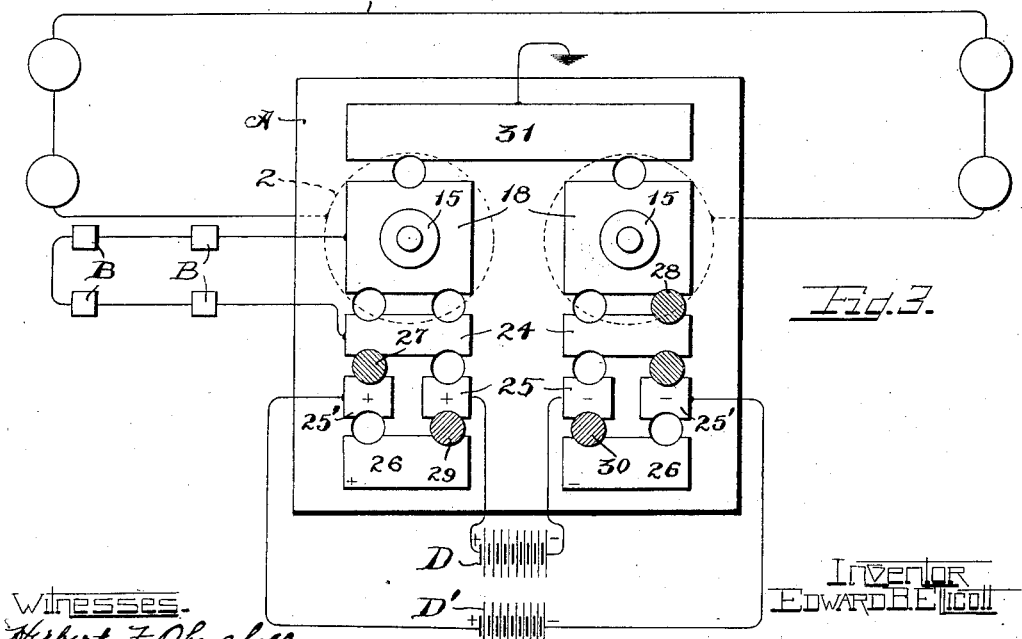
Witnesses.
Herbert F. Obergfell.
Max W. Zabel.
Inventor
Edward B. Ellicott
By Charles A. Bown
Cragg & Belfield
Attorneys.

No. 727,764. Patented May 12, 1903.

UNITED STATES PATENT OFFICE.

EDWARD B. ELLICOTT, OF CHICAGO, ILLINOIS.

ELECTRICAL PROTECTIVE DEVICE.

SPECIFICATION forming part of Letters Patent No. 727,764, dated May 12, 1903.

Application filed December 17, 1901. Serial No. 86,225. (No model.)

*To all whom it may concern:*

Be it known that I, EDWARD B. ELLICOTT, a citizen of the United States, residing at Chicago, in the county of Cook and State of Illinois, have invented a certain new and useful Improvement in Electrical Protective Devices, (Case No. 2,) of which the following is a full, clear, concise, and exact description, reference being had to the accompanying drawings, forming a part of this specification.

My invention relates to protective devices for protecting electrical circuits and instruments thereon from injurious effects of abnormally strong currents. These devices, as is well known, are employed largely on telephone, fire-alarm, and similar circuits in which the currents are small and the potentials are low, and when so employed serve to protect the apparatus upon those circuits from the injurious effects of lightning and currents from power and lighting circuits.

In an application filed by me April 26, 1901, Serial No. 57,613, I have shown and described a protective device embodying certain features of novelty and also a switchboard arrangement by which the circuit or circuits to be protected are effectively and advantageously connected at the exchange.

In the present application I propose to set forth and claim an electrical protector embodying the principles of construction and operation of the protector of my said other application, but having certain features of specific improvement over the same, and to incorporate in this application the claims in my said other application covering the principles of construction and operation of this protector. In my said other application I propose to retain claims covering the switchboard arrangement above referred to.

In the protective device which I herein set forth for carrying out my invention I provide a reciprocable member, such as a plunger, having a considerable extent of reciprocating movement and subject the same to spring means tending to reciprocate it in one direction. I also provide engaging means by which this plunger can be held against the movement of such spring means, and magnetic means by which the plunger can be disengaged to allow the spring means to act upon the passage of an abnormal current. The plunger is arranged so that when it is held in engagement against the action of the spring means the circuit is closed, but when it is released and retracted the circuit is opened. When the plunger is thus released by an abnormal current, the spring quickly and forcibly retracts it, thereby quickly forming a wide gap in the circuit to prevent the flow of the abnormal current and also to prevent arcing therefrom.

In the accompanying drawings I have shown a protective device embodying my invention, although it will be understood that this device is only one of the many different forms which could be constructed to carry out the invention.

In the drawings, Figure 1 is a longitudinal section of such a device in its normal or unoperated condition. Fig. 2 is a similar view of the device after operation by an abnormal current. Fig. 3 is a view of the circuit connections, which, as hereinbefore stated, are set forth particularly and claimed in my said other application. Fig. 4 is a view of a detail of construction.

In the arrangement shown in the figures the protective device is shown secured and connected to a switchboard A, which is understood to be a suitable board at the exchange. The protective device comprises a tubular structure 1 and an electromagnet 2, secured to the end of such structure. The tubular structure or tube 1 is made of insulating material, preferably hard rubber, and is provided with an interior brass or like metallic sleeve 3. Within the end of this sleeve 3 is a hollow metal plug 4, by which the tubular structure is secured to the switchboard A. The rear end of the metallic sleeve 3 is flanged, as at 5. The magnet 2 is provided with a central bore which permits of its being mounted upon the outer end of the tube 1, which bore is provided with a metal end piece $3^a$. This magnet is provided with an exterior shell 6, which forms a portion of the magnetizable structure of the magnet. The magnet is provided with a swinging armature 7, hinged at its lower end to the magnet, as through the medium of a fitting 8, secured to the lower side of the magnet shell or casing 6. This armature 7 is provided with a threaded thumb-nut 9, fitting into a threaded central socket of the armature, and the inner or forward portion of this thumb-nut 9 is made with a cone-shaped cavity 10, the interior walls of the armature-socket for the thumb-nut 9 being desirably also inclined, as at 11 11, to form continuations of the cone-shaped walls of the cavity 10. The armature is provided at its upper end with a screw 12, carrying a threaded weight 13, which by adjustment on the screw 12 can be shifted toward and away from the armature.

Within the bore of the tubular structure 1 is a reciprocating member in the form of a long rod 14, which extends through the bore of the hollow plug 4 and has its forward end provided with a head 15 and its rear end provided with a shoe 16, having its rear end pointed and its forward end made so as to form a shoulder. The plunger 14 is subject to the action of a spring 17, which is confined within the metallic sleeve 3 and has its rear end abutting against the shoulder formed at the rear end of said sleeve by the flange 5. The above-described arrangement is such that when the plunger 14 is pushed back into the tube 1 the shoulder formed by the front face of the shoe 16 will engage the metallic end piece 3ª of the tube 1 and will retain the plunger in such inserted or retracted position against the action of the spring 17. When the armature 7 is swung toward its magnet, the inclined sides of the cavity 10 lift the shoe 16, thereby disengaging the same from the end piece 3ª, whereupon the spring 17 reasserts itself and projects the plunger 14 forwardly. The electrical connections of the device are, as shown in Fig. 2, from the metallic plate 18 on the board A to and through the metal plug 4, the brass sleeve 3, the spring 17, plunger 14, shoe 16, the metal end piece 3ª, and thence to the magnet-coil by wire 19, and out of the same by wire 20. The circuit to be protected is understood to be connected to wire 20 and metallic plate 18. Thus when the device is in position with the plunger retracted and held against the action of the spring, as shown in Fig. 1, the circuit is made through the plunger; but when the plunger is projected forwardly, as shown in Fig. 2, the circuit is broken by the shoe 16 separating from the metal end piece 3ª. Thus when an unduly strong current traverses the circuit it energizes the electromagnet 2, thereby causing the attraction of the armature 7, which strikes against the shoe 16 and releases the plunger 14, whereupon the same is projected and the circuit opened. A wide gap is thus formed in the circuit equal to the distance the shoe 16 separates from the metallic end piece 3ª.

As a matter of further improvement the magnet-shell 6 is provided with contact-strips 21 and 22, insulated from one another and secured in such position that when the armature 7 is attracted to the magnet the lower strip 21 is forced against the upper strip 22, and when the armature is swung down the lower strip 21 is separated from the upper strip 22. The upper strip 22 is connected with the ground, whereby when the armature is swung up and the strip 21 brought into contact with the strip 22 the circuit is grounded. Thus a ground is put on as well as the circuit opened by a wide gap. Referring to this construction and the function of the various parts, it will be noted that the flange 5 of the metallic sleeve 3 forms an abutment for the rear end of the spring 17 and also that the metal end piece 3ª forms a stop for engaging a shoulder on a plunger 14, and these two elements serve as a means of making and breaking the circuit. It will also be noted that the inclined sides of the recess 10 serve to shift the lateral position of the shoe 16 of the plunger 14, and thereby disengage said shoe from the stop by which it is held. By turning the thumb-nut 9 this inclined surface is shifted, so as to cause a proper striking of the shoe 16, thereby in effect permitting adjustment of the plunger-releasing mechanism. The weight 13 by adjustment upon the screw 12 can be made to cause the armature to offer more or less resistance to the action of the magnet 2, and thereby adjust the device perfectly to operate at a predetermined current or changed so as to cause it to operate at different abnormal currents. It will be readily seen that the construction shown and described can be greatly varied without departing from the spirit of my invention. The foregoing statements regarding the various functions of the different parts of the device will serve to indicate certain of the changes which can be made.

With reference to the connection of the device upon the switchboard A and the means by which such connection is procured, this has, as hereinbefore set forth, been fully described and claimed in my said other application Serial No. 57,613. Consequently it will be referred to but briefly herein. In this arrangement (see Fig. 3) the instruments to be protected are represented at B B, and the exterior portion of the circuit containing these instruments is represented at C. Two protectors are employed for protecting the instruments B B, and the switchboard is provided with suitable means by which the circuit can be operated by either one of the two batteries D D' while the protective devices are still retained in circuit. To such end the board A is provided with two metallic plates or contacts 18 18 for the two protective devices and also with metallic plates or contacts 24 24, 25 25, 25' 25', and 26 26, all located as shown in the drawings. The battery D is connected with plates or terminals 25 25 and the battery D' with plates or terminals 25' 25', as indicated. Plugs 27, 28, 29, and 30 are provided, by which the circuit connections can be varied, as described in my said other application. By this arrangement either of the batteries D D' can be employed while the other is being charged. A ground-plate 31 is also provided.

What I claim as my invention is—

1. In a device of the class specified, the combination of a reciprocable plunger, spring means tending to hold the same in retracted position, means for engaging the plunger so as to hold it in projected position, and an electromagnetic device having a movable part adapted to strike against the plunger when such device is energized and thereby disengage the plunger and allow the same to become retracted, substantially as described.

2. The combination with the circuit to be protected, of a device for protecting the same, comprising a tubular structure, a reciprocating plunger arranged therein, spring means tending to retract the plunger, means for holding the plunger in a projected position, an electromagnetic device having a movable part adapted when operated to release the plunger by striking it and thereby permit the spring to retract the same, the said electromagnetic device being included in the circuit to be protected and adjusted to be operated only by abnormal currents, and a metallic portion engaged by the plunger which is also metallic, the plunger and the metallic portion being included in the circuit to be protected, substantially as described.

3. In a device of the class specified, the combination with a reciprocable plunger, of a tubular structure inclosing the same, spring means tending to retract the plunger, means for holding the plunger in a projected condition, and an electromagnetic device arranged at the end of the tubular structure and having an armature arranged to strike the plunger when the magnetic device is actuated and thereby release the plunger and permit the spring to retract the same, substantially as described.

4. In a device of the class specified, the combination with a tubular structure, of a support arranged at one end of the same, a reciprocable plunger arranged within the tubular structure and having one of its ends extended through the support, means for engaging the other end of the plunger, spring means tending to retract the plunger, an electromagnet mounted on the end of the tubular structure opposite the support and made hollow so that it surrounds the plunger, and a swinging armature for said magnet adapted to release the plunger and permit the spring means to actuate the same, substantially as described.

5. In a device of the class specified, the combination of a reciprocable plunger provided with a shoulder, spring means tending to actuate the plunger, a stop for engaging the shoulder on the plunger, an electromagnet having an armature adapted when actuated to strike the plunger and release its shoulder from the stop, substantially as set forth.

6. In a device of the class specified, the combination of a reciprocable plunger having a shoulder, spring means tending to actuate said plunger, a stop adapted to engage the shoulder thereon, and an electromagnet having an armature provided with an inclined surface adapted to strike the end of the plunger and shift the same laterally to release it from said stop, substantially as described.

7. In a device of the class specified, the combination with a reciprocable plunger, of a shoe on the end thereof, said shoe having a front face forming a shoulder and also having a pointed end, spring means tending to actuate said plunger, a stop adapted to engage the front face on said shoe, an electromagnet having an armature provided with a cone-shaped recess located substantially opposite the shoe on the end of the plunger, whereby when the armature swings the inclined sides of the cone-shaped recess strike against the shoe and plunger and disengage the same from the stop, substantially as described.

8. In a device of the class specified, the combination of a tubular structure having a brass sleeve at its forward end, which sleeve has its rear end flanged, a plunger arranged within said tubular structure and having its rear end provided with a shoe affording a shoulder and having its rear end pointed, a spring arranged within said metallic sleeve and adapted to project the plunger, the flange on said sleeve serving as an abutment for the rear end of the spring, a metallic piece at the rear end of the tubular structure adapted to serve as a stop to engage the face on the plunger-shoe, and an electromagnet on the rear end of the tubular structure, said magnet having a swinging armature provided with a cone-shaped cavity arranged substantially opposite the shoe on the plunger, substantially as described.

9. In a device of the class specified, the combination of a tubular structure having a brass sleeve at its forward end, which sleeve has its rear end flanged, a plunger arranged within said tubular structure and having its rear end provided with a shoe affording a shoulder and having its rear end pointed, a spring arranged within said metallic sleeve and adapted to project the plunger, the flange on said sleeve serving as an abutment for the rear end of the spring, a metallic piece at the rear end of the tubular structure adapted to serve as a stop to engage the face on the plunger-shoe, an electromagnet on the rear end of the tubular structure, said magnet having a swinging armature provided with a cone-shaped cavity arranged substantially opposite the shoe on the plunger, and a pair of contacts on the magnet arranged to lie in the path of the armature so as to be actuated thereby, substantially as described.

10. In a device of the class specified, the combination of a tubular structure having a brass sleeve at its forward end, which sleeve has its rear end flanged, a plunger arranged within said tubular structure and having its rear end provided with a shoe affording a shoulder and having its rear end pointed, a spring arranged within said metallic sleeve and adapted to project the plunger, the flange on said sleeve serving as an abutment for the rear end of the spring, a metallic piece at the rear end of the tubular structure adapted to serve as a stop to engage the face on the plunger-shoe, and an electromagnet on the rear end of the tubular structure, said magnet having a swinging armature provided with a threaded thumb-nut having a conical recess arranged substantially opposite the shoe on the plunger, substantially as described.

11. In a device of the class specified, the combination of a tubular structure having a brass sleeve at its forward end which sleeve has its rear end flanged, a plunger arranged within said tubular structure and having its rear end provided with a shoe affording a shoulder and having its rear end pointed, a spring arranged within said metallic sleeve and adapted to project the plunger, the flange on said sleeve serving as an abutment for the rear end of the spring, a metallic piece at the rear end of the tubular structure adapted to serve as a stop to engage the face on the plunger-shoe, an electromagnet on the rear end of the tubular structure, said magnet having a swinging armature provided with a cone-shaped cavity arranged substantially opposite the shoe on the plunger, a screw arranged transversely to the swinging armature, and a weight having threaded connection with said screw, substantially as described.

12. The combination with the circuit to be protected, of a device for protecting the same, comprising a reciprocating plunger, spring means tending to retract the plunger, means for holding the plunger in a projected position, an electromagnetic device having a movable part adapted when operated to release the plunger by striking it and thereby permit the spring to retract the same, the said electromagnetic device being included in the circuit to be protected and adjusted to be operated only by abnormal currents, and a metallic portion engaged by the plunger which is also metallic, the plunger and the metallic portion being included in the circuit to be protected, substantially as described.

In witness whereof I hereunto subscribe my name this 11th day of December, A. D. 1901.

EDWARD B. ELLICOTT.

Witnesses:
MAX W. ZABEL,
HARVEY L. HANSON.